US008675563B2

(12) United States Patent
Li et al.

(10) Patent No.: US 8,675,563 B2
(45) Date of Patent: *Mar. 18, 2014

(54) METHOD AND APPARATUS FOR INTERFERENCE CONTROL IN A MULTI-CELL COMMUNICATION SYSTEM

(75) Inventors: Xiaodong Li, Kirkland, WA (US); Titus Lo, Bellevue, WA (US); Haiming Huang, Bellevue, WA (US); Kemin Li, Bellevue, WA (US); Jun Meng, Bellevue, WA (US)

(73) Assignee: Neocific, Inc., Bellevue, WA (US)

( * ) Notice: Subject to any disclaimer, the term of this patent is extended or adjusted under 35 U.S.C. 154(b) by 205 days.

This patent is subject to a terminal disclaimer.

(21) Appl. No.: 13/252,990

(22) Filed: Oct. 4, 2011

(65) Prior Publication Data

US 2012/0026896 A1    Feb. 2, 2012

Related U.S. Application Data

(63) Continuation of application No. 11/569,064, filed as application No. PCT/US2005/023399 on Jun. 29, 2005, now Pat. No. 8,031,686.

(60) Provisional application No. 60/584,215, filed on Jun. 30, 2004.

(51) Int. Cl.
*H04W 52/04* (2009.01)

(52) U.S. Cl.
USPC ............ 370/328; 370/342; 370/252; 370/318; 370/248

(58) Field of Classification Search
USPC .................. 370/248, 328, 280, 252, 342, 329; 455/522, 452, 453, 452.2, 452.1
See application file for complete search history.

(56) References Cited

U.S. PATENT DOCUMENTS

| | | | |
|---|---|---|---|
| 6,035,208 A * | 3/2000 | Osawa ......................... | 455/522 |
| 6,377,783 B1 | 4/2002 | Lo et al. | |
| 6,442,222 B1 | 8/2002 | Ghazi-Moghadam et al. | |
| 6,459,740 B1 | 10/2002 | Lo | |
| 6,490,270 B1 | 12/2002 | Krishnamoorthy et al. | |
| 6,836,666 B2 * | 12/2004 | Gopalakrishnan et al. ......................... | 455/452.2 |
| 6,847,678 B2 | 1/2005 | Berezdivin et al. | |
| 6,940,827 B2 | 9/2005 | Li et al. | |

(Continued)

FOREIGN PATENT DOCUMENTS

| | | |
|---|---|---|
| CN | 1407816 A | 4/2003 |
| WO | WO-03/034646 A2 | 4/2003 |

OTHER PUBLICATIONS

International Search Report, International Application No. PCT/US05/23399; Filed Jun. 29, 2005; Mailed Mar. 1, 2006; 9 pages.

(Continued)

*Primary Examiner* — Rasheed Gidado
(74) *Attorney, Agent, or Firm* — Perkins Coie LLP

(57) ABSTRACT

Methods and apparatus disclosed maximize the capacity of serving cells and minimize inter-cell interferences due to power emission from serving cells in a multi-carrier, multi-cell communication system. The control methods and apparatus take into account various factors such as cell configuration, frequency reuse, geometry and path-loss information, transmission priority, subchannel configuration, feedback from other cells, or any combination thereof, and produce signals that control the transmission power levels and the modulation and coding of transmitted signals.

21 Claims, 13 Drawing Sheets

(56) References Cited

U.S. PATENT DOCUMENTS

| | | | |
|---|---|---|---|
| 6,940,914 | B1 | 9/2005 | Lo et al. |
| 6,947,748 | B2 | 9/2005 | Li et al. |
| 7,013,143 | B2 | 3/2006 | Love et al. |
| 7,020,072 | B1 | 3/2006 | Li et al. |
| 7,123,580 | B2 | 10/2006 | Tang et al. |
| 7,164,669 | B2 | 1/2007 | Li et al. |
| 7,181,246 | B2 | 2/2007 | Lo |
| 7,227,850 | B2 | 6/2007 | Dahlman et al. |
| 7,260,361 | B2 | 8/2007 | Jacobsen |
| 7,324,821 | B2 | 1/2008 | Kwak et al. |
| 7,411,974 | B2 | 8/2008 | Attar et al. |
| 7,525,909 | B2 | 4/2009 | Fan et al. |
| 7,602,722 | B2 | 10/2009 | Chheda |
| 7,668,561 | B2 | 2/2010 | Au et al. |
| 7,706,346 | B2 | 4/2010 | Huo et al. |
| 8,031,686 | B2 | 10/2011 | Li et al. |
| 2004/0100921 | A1 | 5/2004 | Khan |
| 2004/0165559 | A1* | 8/2004 | Kwak et al. .................... 370/335 |
| 2004/0258035 | A1* | 12/2004 | Fan et al. ...................... 370/342 |
| 2005/0143011 | A1* | 6/2005 | Jacobsen ..................... 455/67.13 |
| 2005/0250511 | A1* | 11/2005 | Xiao et al. .................... 455/453 |

OTHER PUBLICATIONS

Yoshika et al. "High Bit Rate Transmission Scheme with a Multilevel Transmit Power Control for the OFDM based Adaptive Modulation Systems"2001, IEEE.

\* cited by examiner

METHOD AND APPARATUS FOR INTERFERENCE CONTROL IN A MULTI-CELL COMMUNICATION SYSTEM

CROSS-REFERENCE TO RELATED APPLICATION(S)

This application is a continuation application of and incorporates by reference U.S. patent application Ser. No. 11/569,064, having a 371 date of Jun. 12, 2007, which is a U.S. National Stage of International Application No. PCT/US05/23399, filed Jun. 29, 2005, which claims the benefit of U.S. Provisional Patent Application No. 60/584,215 filed on Jun. 30, 2004.

BACKGROUND

Compared with Code-Division Multiple Access (CDMA) systems, Multi-Carrier (MC) systems, such as Orthogonal Frequency Division Multiple Access (OFDMA) systems, have the advantage of less intra-cell/sector interference due to the orthogonality between the so called subcarriers. However, the inter-cell interference remains a challenging problem for MC systems, especially for those with high frequency reuse.

Power control and adaptive modulation and coding are two effective methods to increase the capacity of wireless systems. For example, power control based on the concept of Rising over Thermal (RoT) were considered in CDMA. In an MC system such as an OFDMA system, with many system characteristics that are different from other types of systems, including CDMA, it remains a practical problem to carry out adaptive modulation and coding in addition to controlling the power to deal with the inter-cell interference and to maximize the network capacity.

DETAILED DESCRIPTION

The multi-carrier system mentioned throughout the following description can be of any format such as OFDM, or Multi-Carrier Code Division Multiple Access (MC-CDMA). The presented methods can also be applied to downlink, uplink, or both, where the duplexing technique is either Time Division Duplexing (TDD) or Frequency Division Duplexing (FDD).

The following description provides specific details for a thorough understanding of the various embodiments and for the enablement of one skilled in the art. However, one skilled in the art will understand that the invention may be practiced without such details. In some instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number in this Detailed Description section also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

Figure 1:
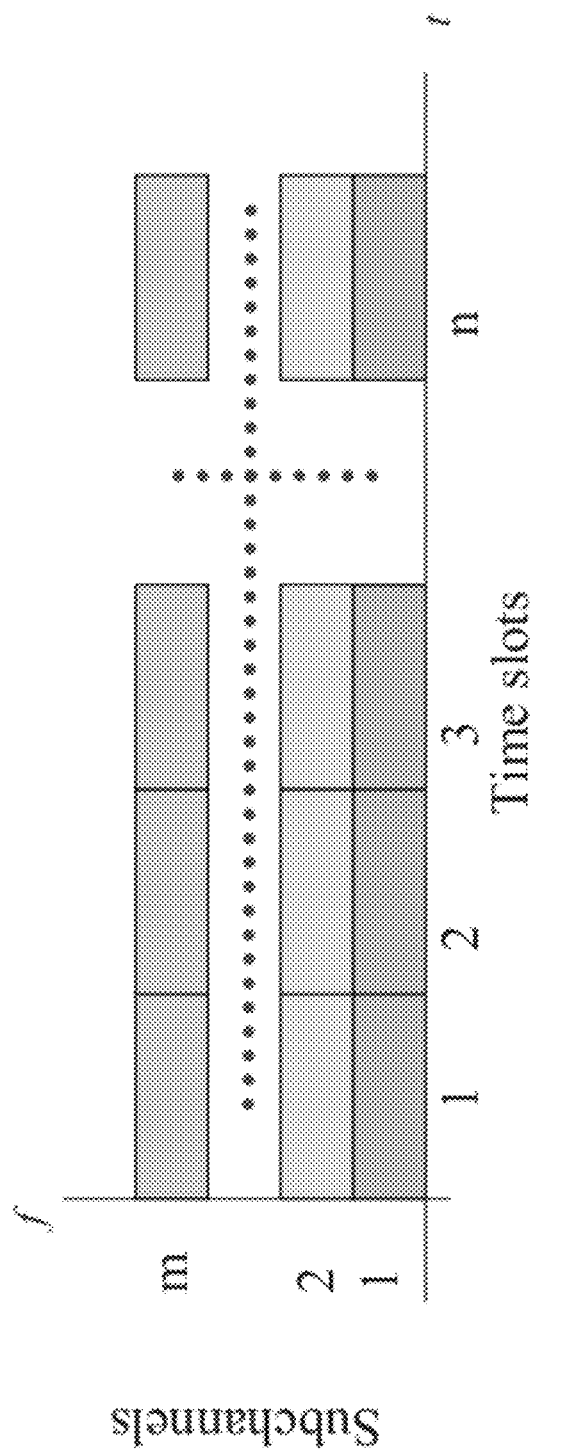
FIG. 1 shows a radio resource divided into small units in both frequency and time domains—subchannels and time slots, respectively.

As depicted in FIG. 1, a physical media resource (e.g., radio or cable) in a multi-carrier communication system can be divided in both the frequency and time domains. This canonical division provides high flexibility and fine granularity for resource sharing.

Figure 2:
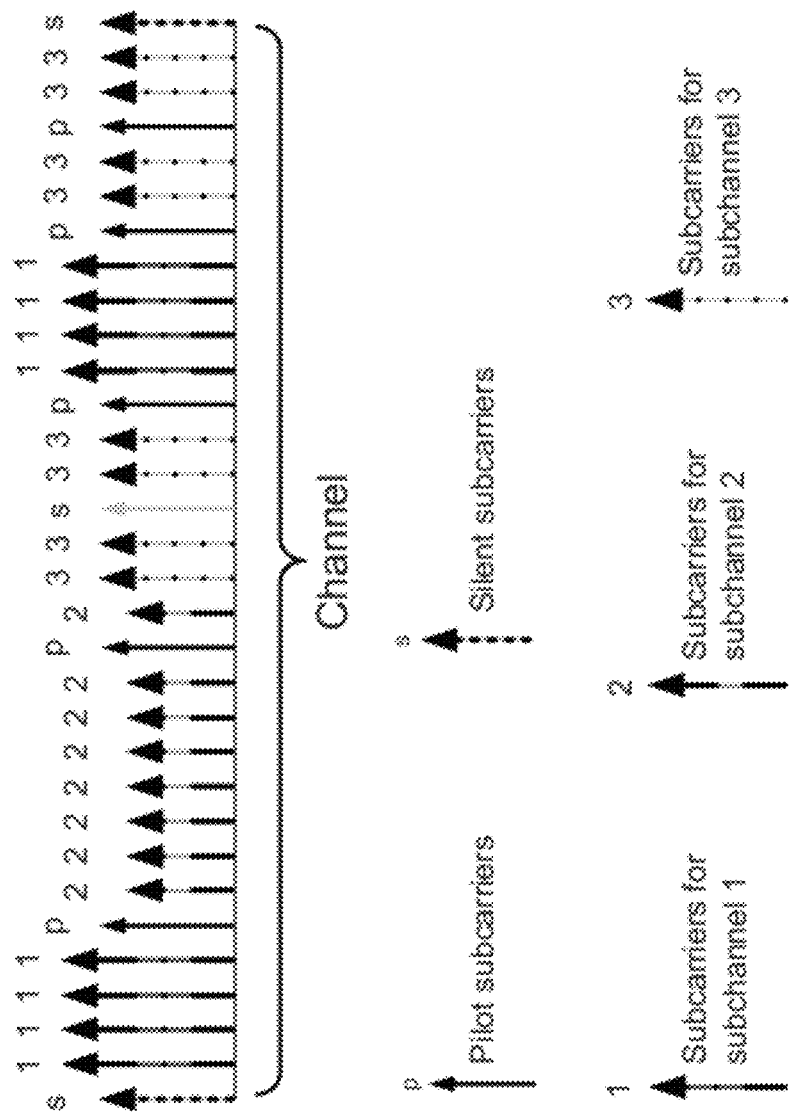
FIG. 2 illustrates three types of subcarriers.

The basic structure of a multi-carrier signal in the frequency domain is made up of subcarriers. Subchannels are formed by subcarriers and each subchannel may be set at a different power level. Data subcarriers can be grouped into subchannels in specific ways. Within a particular spectral band or channel, there are a fixed number of subcarriers. FIG. 2 illustrates three types of subcarriers as follow:

1. Data subcarriers, which carry information data;
2. Pilot subcarriers, whose phases and amplitudes are predetermined and made known to all receivers and which are used for assisting, system functions such as estimation of system parameters; and
3. Silent subcarriers, which have no energy and are used for guard bands and as DC carrier.

The data subcarriers can be arranged into groups called subchannels to support scalability and multiple-access. The subcarriers forming one subchannel may or may not be adjacent to each other. Each user may use some or all of the subchannels. A subchannel formed by the contiguous subcarriers is called a congregated (or clustered) subchannel. A congregated subchannel may have a different power level from others.

Figure 3:
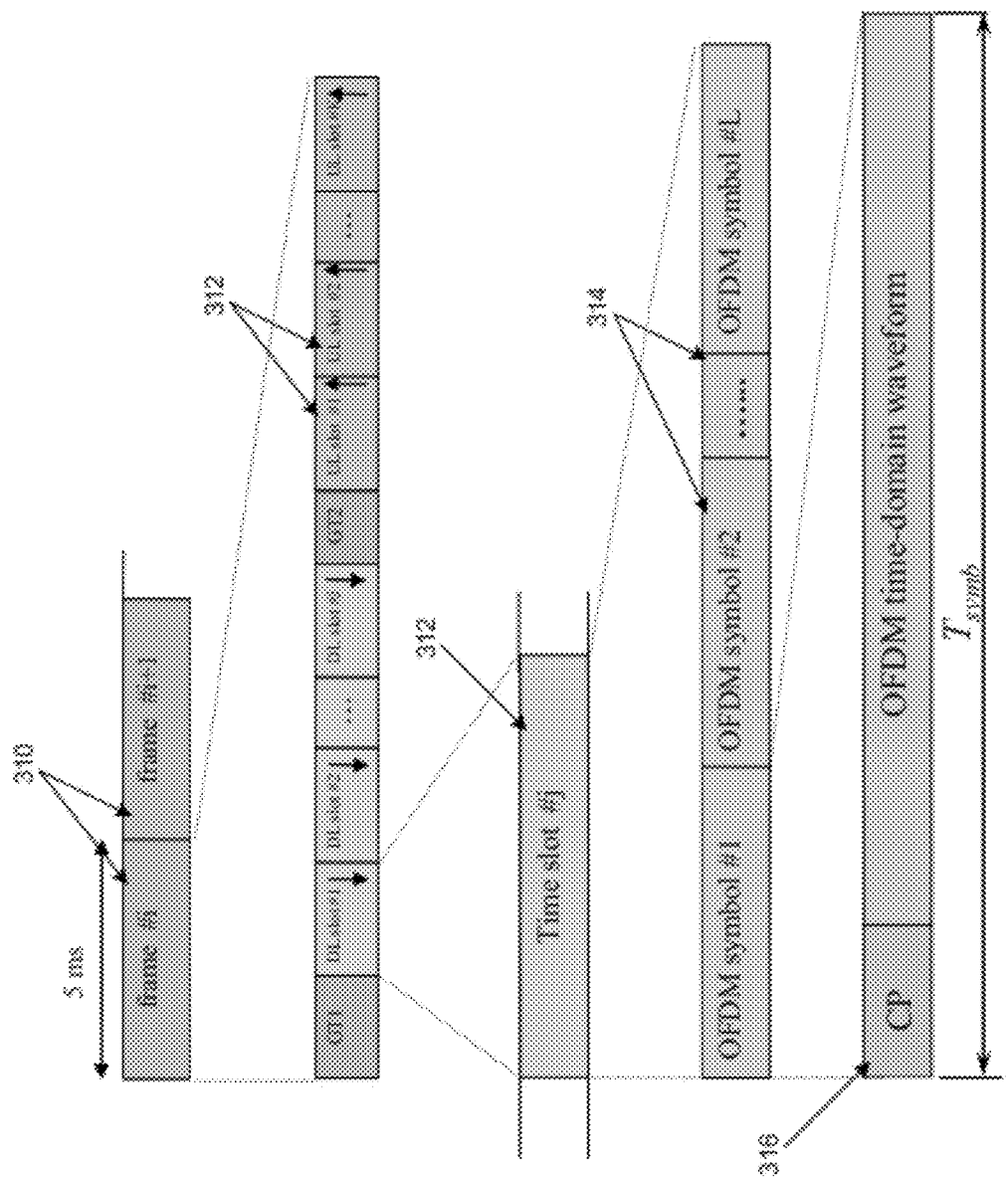
FIG. 3 illustrates a basic structure of a multi-carrier signal in the time domain which is generally made up of time frames, time slots, and OFDM symbols.

As depicted in FIG. 3, the basic structure of a multi-carrier signal in the time domain is generally made up of time frames 310, time slots 312, and OFDM symbols 314. A frame 310 consists of a number of time slots 312, whereas each time slot 312 is comprised of a number of OFDM symbols 314. The OFDM time domain waveform is generated by applying the inverse-fast-Fourier-transform (IFFT) to the OFDM signals in the frequency domain. A copy of the last portion of the time waveform, known as the cyclic prefix (CP) 316, is inserted in the beginning of the waveform itself to form the OFDM symbol 314. Using the cyclic prefix extension, the samples required for performing the FFT at the receiver can be taken anywhere over the length of the symbol. This provides multipath immunity as well as a tolerance for symbol time synchronization errors.

Figure 4:
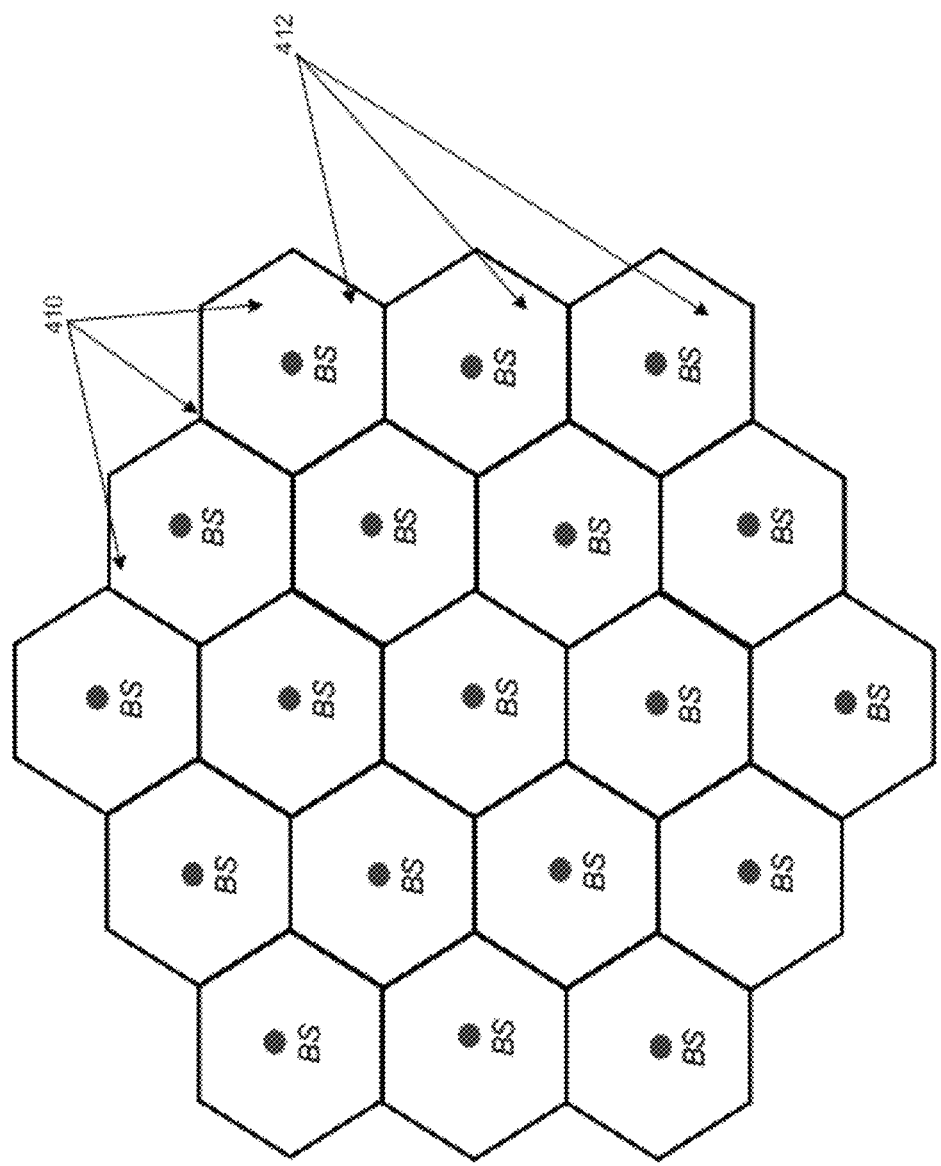
FIG. 4 depicts a cellular wireless network comprised of a plurality of cells, where coverage in each cell is provided by a base station (BS).

FIG. 4 illustrates a structure normally referred to as the cellular structure. In a cellular wireless network, the geographical region to be serviced by the network is normally divided into smaller areas called cells 410. In each cell 410 the coverage is provided by a base station (BS) 412. Within each coverage area, mobile stations are used as interfaces between the users and the network. A base station 412 is connected to the backbone of the network, usually by a dedicated link. A base station 412 also serves as a focal point to distribute information to, and collect information from, its mobile stations by radio signals.

In a cellular system with base stations and mobile stations, the transmission from a base station to a mobile station is called a downlink and the transmission from a mobile station to a base station is called an uplink. Each base station provides coverage to its designated area, normally called a cell. If a cell is divided in to sectors, from system engineering point of view each sector can be considered as a cell. In this context, the terms "cell" and "sector" are interchangeable. Also, the so called "base stations" may be base station transceivers which are physically located together but their antennas face different directions/sectors.

Figure 5:
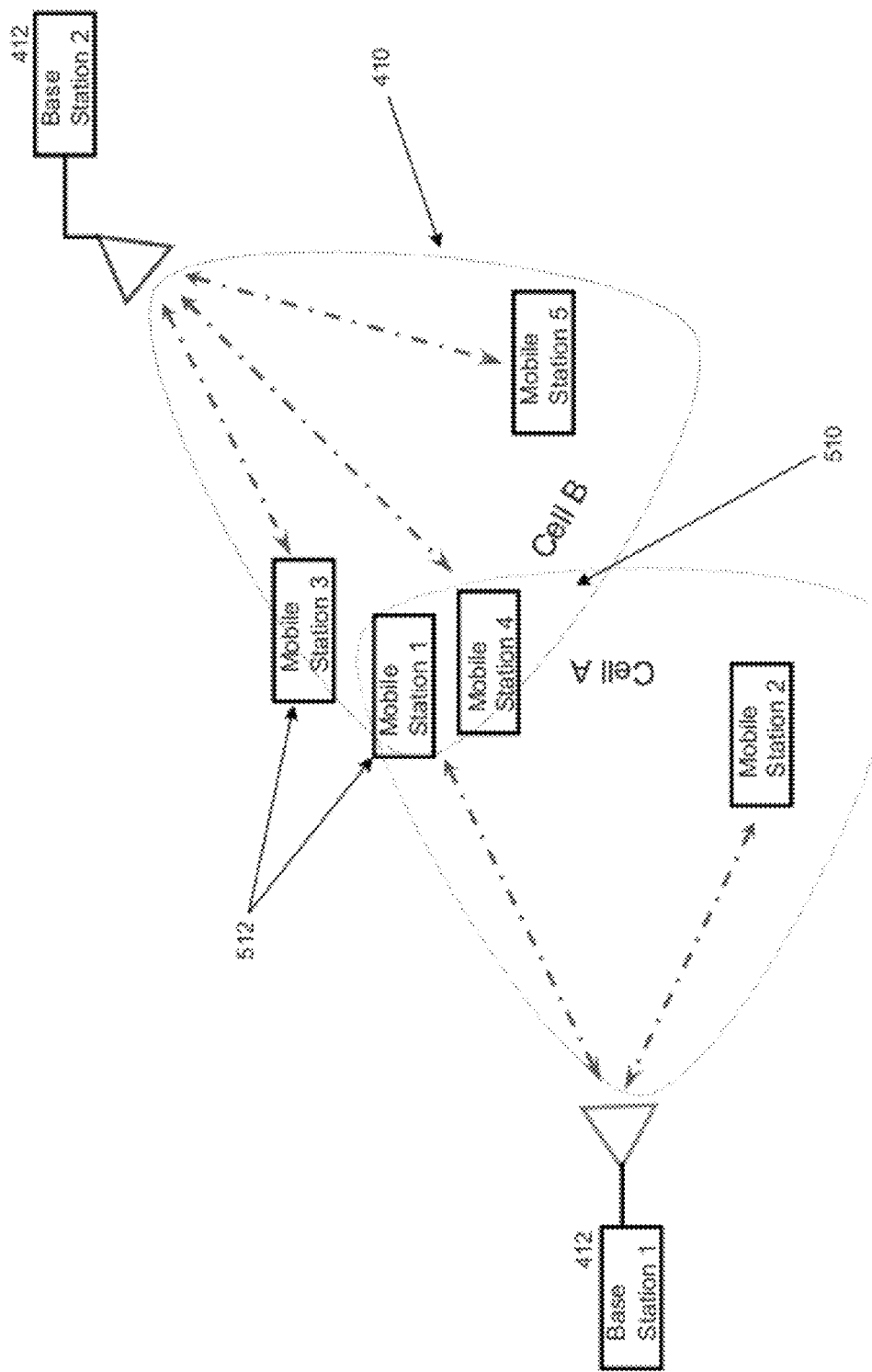
FIG. 5 shows a network where adjacent cells use a same frequency for their transmissions and mobile stations at a boundary of one cell cause interference to those in an adjacent cell.
Figure 6:
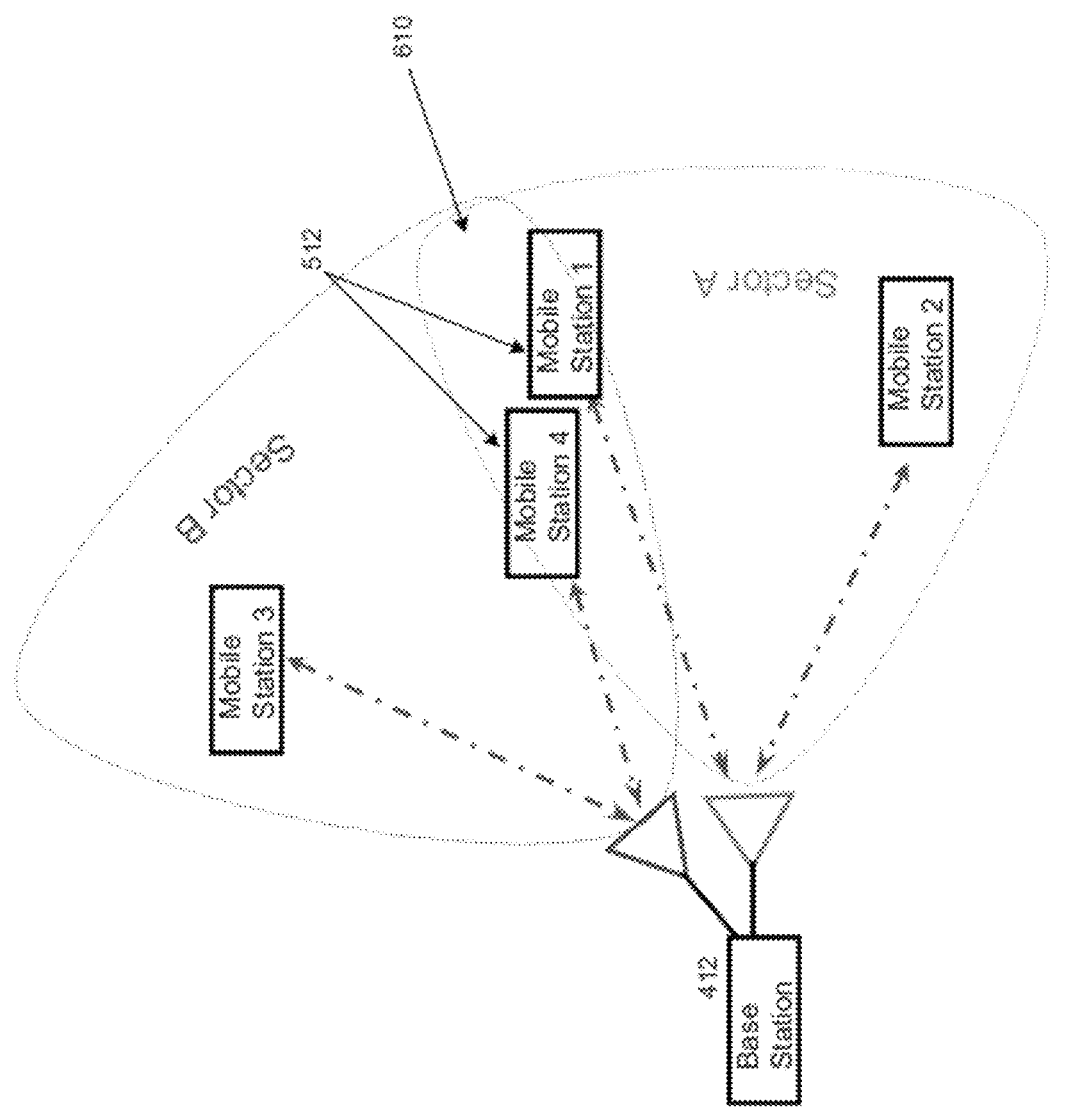
FIG. 6 shows a network where mobile stations at their signal overlapping area cause interference to those in adjacent sectors using same channels.

At the boundary 510 of a cell 410, as illustrated in FIG. 5, mobile stations 512 may have to transmit higher power to compensate for the higher path loss, in which case it may cause strong interference to the base station 412 in the adjacent cell. This can also happen in the overlapping areas 610 of two adjacent sectors of the same cell, as illustrated in FIG. 6.

Figure 8:
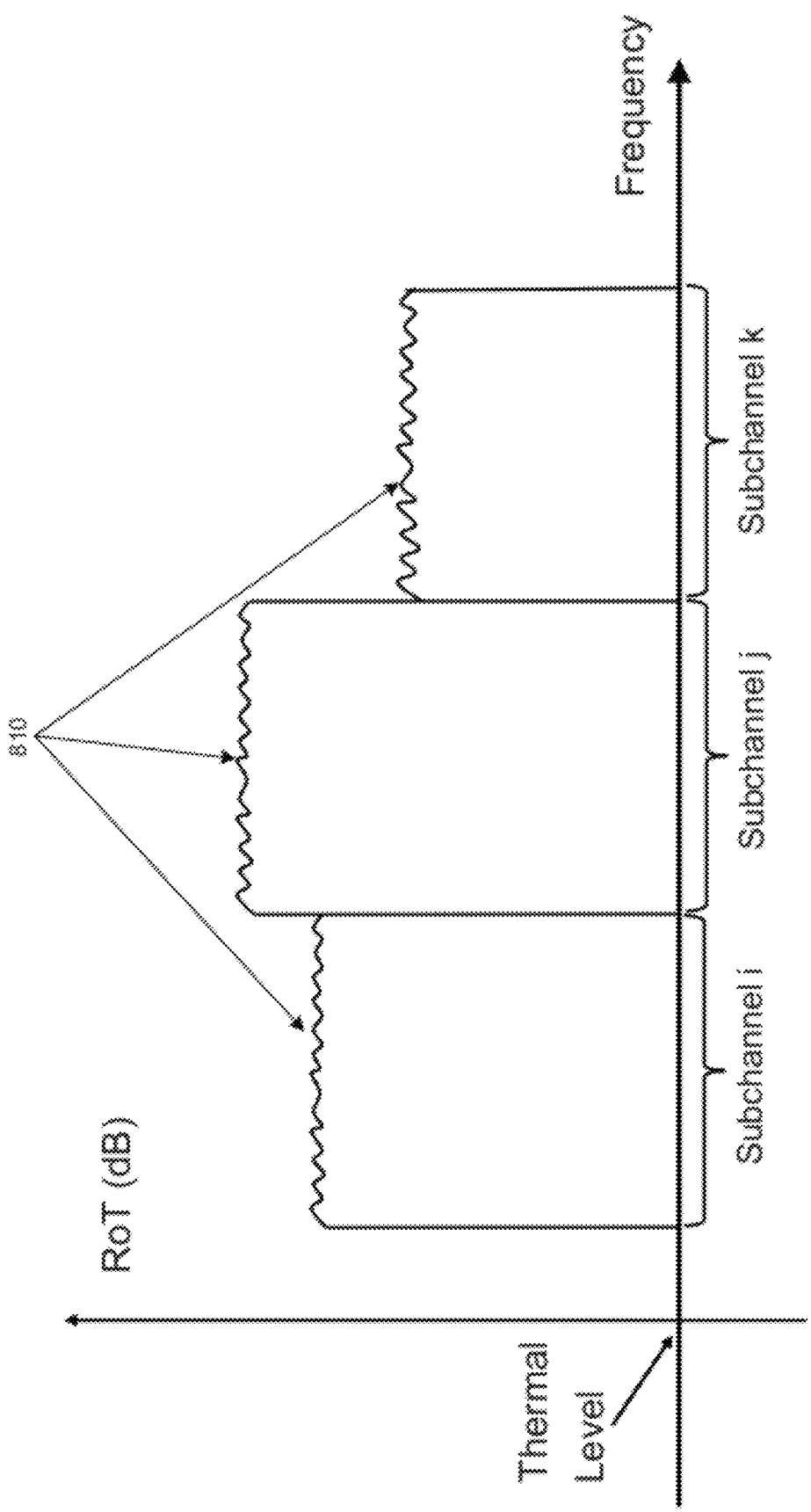
FIG. 8 is an illustration of Rise over Thermal (RoT) which is a ratio of received power density to thermal noise power density for each subchannel, and if RoT is in dB format, it is a difference between the received power in dB and the thermal noise in dB.

The Rising over Thermal (RoT) value is defined as the difference between the averaged received signal power density level (in decibel) and the thermal noise power density level (in decibel) with respect to a unit of frequency bandwidth. In the linear scale, RoT is equivalent to the signal-to-noise ration (SNR). In this context, SNR and RoT are interchangeable. In the case of an OFDMA network, the RoT is measured in frequency domain for one or more subchannels 810, as shown in FIG. 8. The averaged RoT of a channel is the sum of the RoT of each subchannel divided by the number of subchannels.

One of the objectives of transmission power control using the RoT constraint is to limit the inter-cell interference in a multi-carrier, multi-cell wireless communication network, so as to achieve a balance between maximizing the capacity of the serving cell and minimizing the reduction of the capacity of other cells due to the power emission from the serving cell. A set of rules will be either self-imposed or be imposed by a remote controller on a transmitter (a base station or a mobile station) to set the transmission power and the MCS (Modulation and Coding Schemes).

In accordance with aspects of the disclosed embodiments, an AMCP (Adaptive Modulation, Coding, and Power control) controller is devised to perform the power control operation in a multi-carrier, multi-cell wireless communication network with subchannel configurations to mitigate the inter-cell interference. The inputs to the AMCP controller include the Channel Quality measurement Information (CQI), the RoT measurement, and other factors such as RoT threshold, channel quality requirement, transmission power range and service type. The outputs of the AMCP controller include the transmission power and MCS.

In one embodiment, each subchannel may use an MCS and a power control different from those of other subchannels. The AMCP controller then determines the MCS and transmission power level, and performs the RoT check for each subchannel individually.

In another embodiment, multiple subchannels, for example, subchannels assigned to the same user, may use the same MCS and power control to reduce the control overhead. The AMCP controller then determines the MCS and transmission power level for the subchannels under consideration jointly. The AMCP controller also performs the RoT check jointly for these subchannels.

Without loss of generality, in this text, a power level, such as the transmission power level or reception power level, implies the average power density of a subchannel or multiple subchannels. The actual power is the power density multiplied by the bandwidth of a subchannel or multiple subchannels. The total power is then the sum of the power of each user in the system.

In the following description, certain parameters and control procedures are used to illustrate different aspects of the invention. However, it should be noted that other equivalent implementation, for example, altering the order of control steps, may be designed to achieve the same effects.

In one embodiment, shown in FIG. 7, the AMCP controller 710 receives frequently changing and updated information such as the CQI and the RoT measurement, as well as relatively less frequently changing and updated information such as RoT threshold, service type, quality requirement, transmitter power range, and other factors considered below. A control algorithm, described below, uses part or all of these inputs to generate outputs such as the MCS and the transmission power level, which are sent to and followed by the transmitter during its next transmission.

The CQI can be SINR (signal-to-interference-plus-noise ratio), BER (bit error rate), PER (packet error rate), or any combination thereof. The CQI may also be a single number, such as the averaged SINR or statistics such as the distribution of SINR or the mean and variance of SINR.

Different service types, referred to as applications, such as data, voice, or video may require different power control mechanisms.

The transmission power range is set to keep the transmission power within the range of transmitter power emission capability. When the total power of a transmitter is limited, the maximum transmission power density is inversely proportional to the bandwidth used.

The quality requirement, referred to as the requirements on the signal quality to maintain the data throughput or voice quality, may include BER/PER or SINR thresholds for different MCS. More details on the generation and use of the quality requirement will be elaborated in the ensuing embodiments.

The RoT threshold is the maximum allowable RoT. It is used as one factor to regulate the transmission power level. One purpose of setting the RoT threshold is to limit the interference with the other cells and to stabilize the power control of a multi-cell network. More details on the generation and use of the RoT threshold will also be elaborated in the ensuing embodiments.

Figure 7:
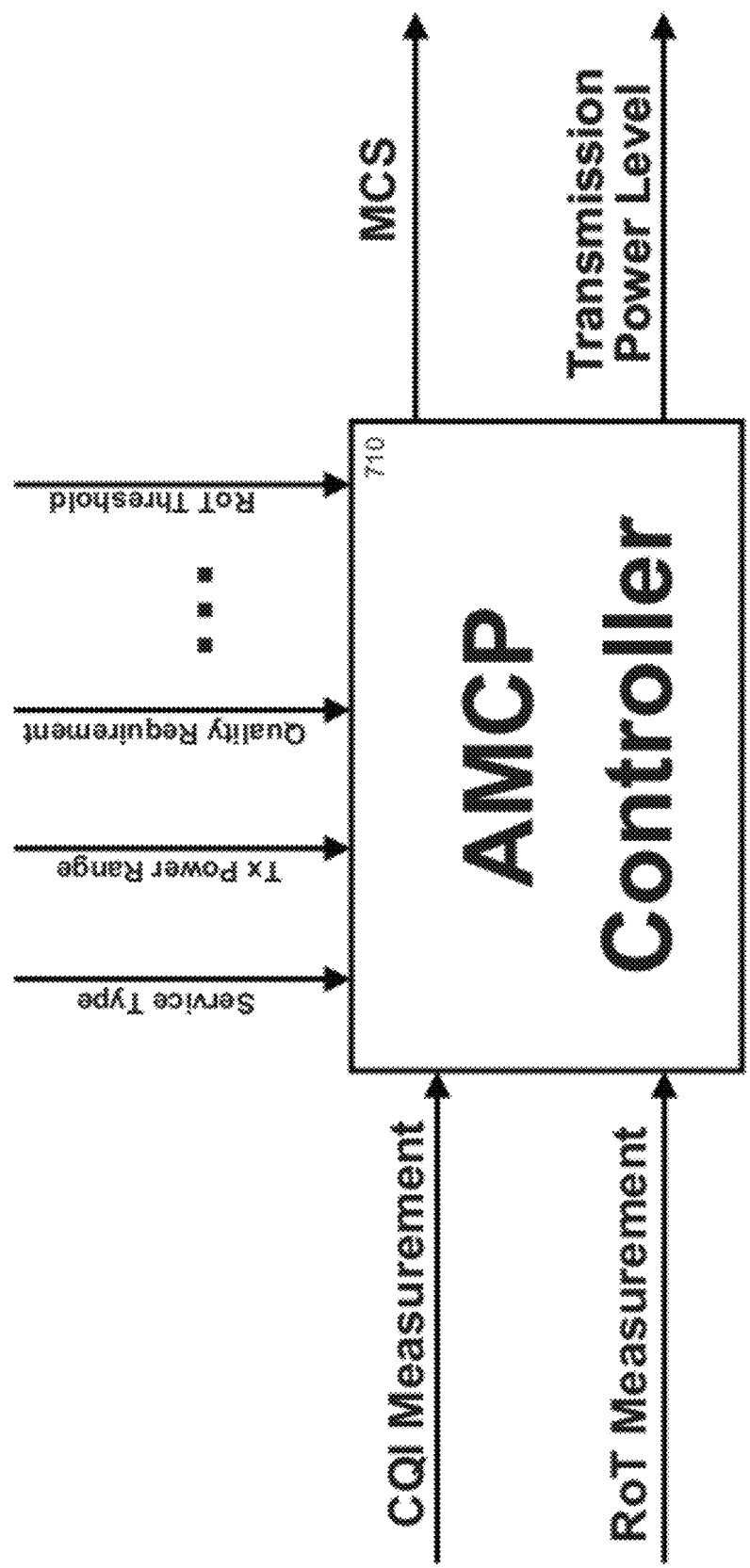
FIG. 7 illustrates an AMCP (Adaptive Modulation, Coding, and Power) controller with its inputs and outputs, wherein the AMCP controller uses part or all of its inputs to generate its outputs.

The AMCP controller 710, depicted in FIG. 7, generates outputs such as the MCS and the transmission power level for a mobile station or a subchannel, which are sent to and followed by the transmitter during its next transmission. The power control may include the requested absolute power level and/or the relative amount to increase or decrease the current power setting. In one embodiment, the power levels of different subchannels are set differently such that an appropriate power is allocated to each subchannel to satisfy its required performance while minimizing interference to other users.

Figure 9:
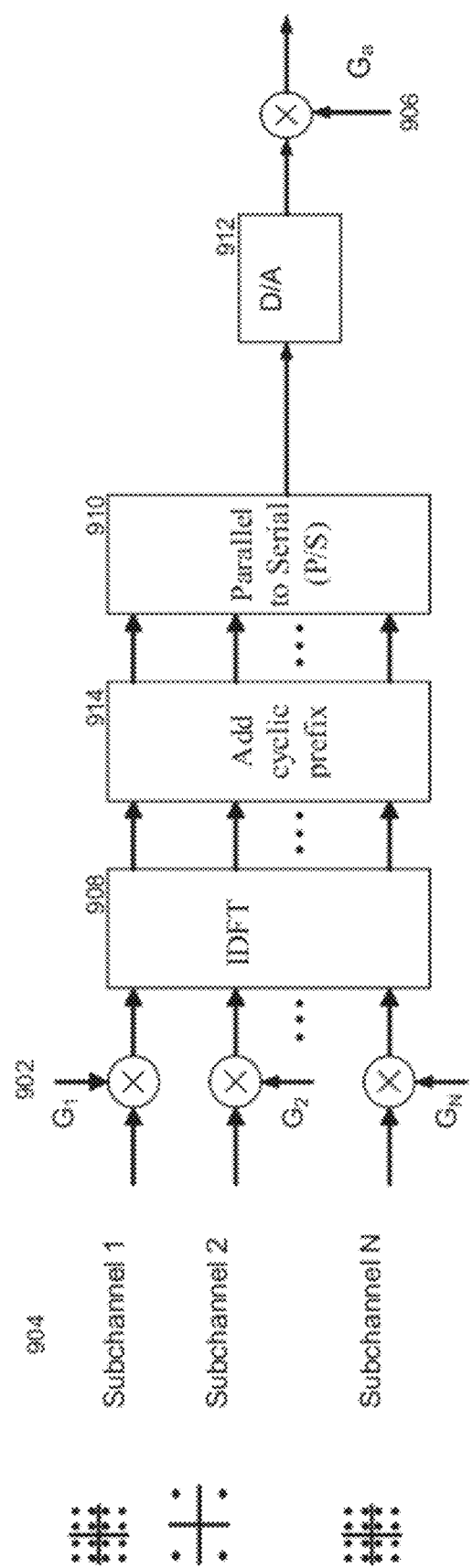
FIG. 9 is an illustration of power control in an exemplary OFDM system where digital variable gains $G_1, G_2 \ldots$ and $G_N$ are applied to the subchannels that may use different MCS (Modulation and Coding Schemes) and transmission power levels.

FIG. 9 is an illustration of a power control in an OFDM system where digital variable gains 902 $G_1, G_2 \ldots G_N$ are applied to subchannels 904 that may have different MCSs with different transmission power levels. Analog domain gain 906 $G_a$ is used to control the total transmission power signal processes to meet the requirements of the transmission power of the device. In FIG. 9, after variable gains are applied to subchannels 904, they are inputted to an inverse discrete Fourier transform (IDFT) module 908. The outputs from the IDFT are time domain signals, which are converted from parallel to sequential signals (block 910) and converted to analog (block 912) after a cyclic prefix is added to them (block 914).

In one embodiment, the AMCP controller 710 maximizes the data throughput while meeting the requirement of RoT threshold and controlling the transmission power, using the following two-step control procedure.

Figure 10:
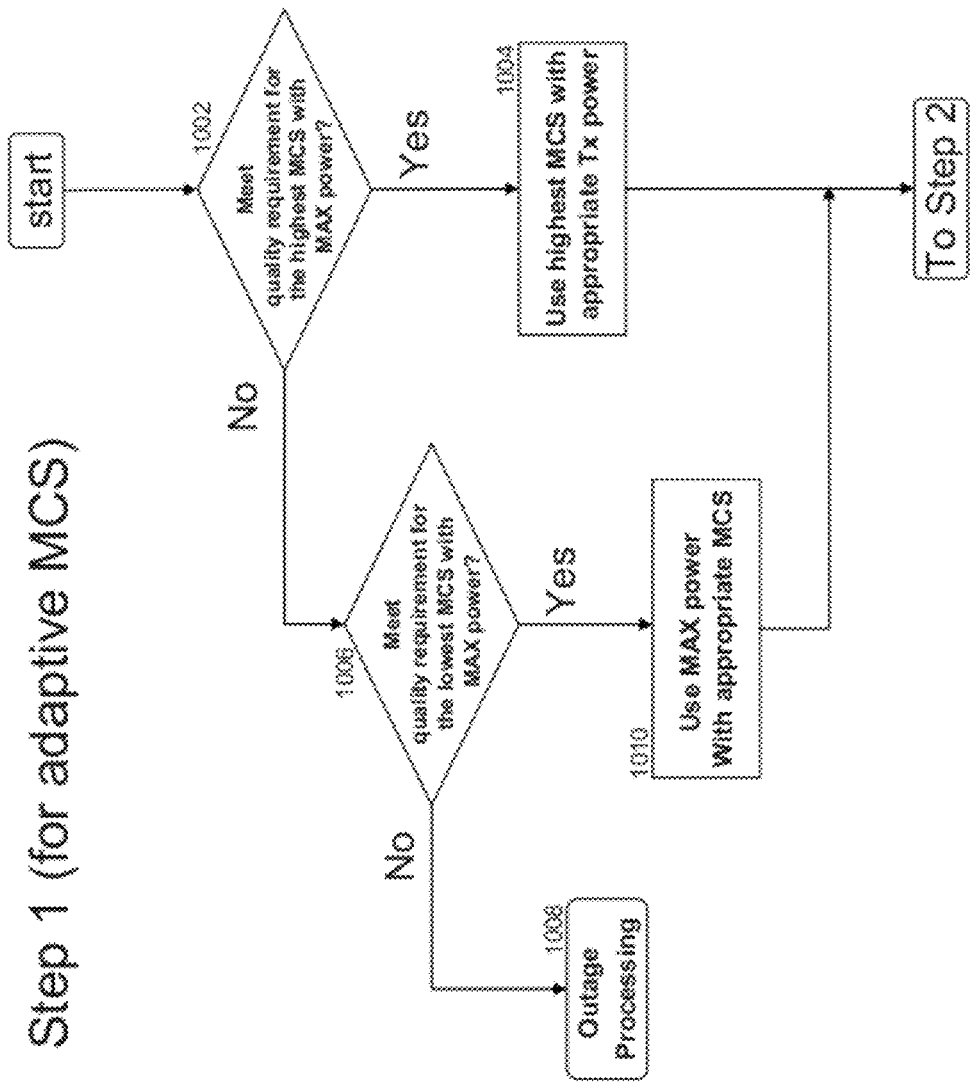
FIG. 10 illustrates a first step of a control algorithm, where a AMCP controller derives an appropriate transmission power level and an MCS without consideration of RoT threshold.

As shown in FIG. 10, in Step 1, the AMCP controller 710 derives an appropriate transmission power level and MCS (block 1002), without considering the RoT threshold. An achievable CQI ($Q_{new}$) at the receiver is updated by, $$Q_{new} = Q_{current} + P_{max} - P_{current}$$

where $Q_{current}$ denotes the current measured CQI at the receiver, $P_{max}$ denotes the maximum transmission power available at the transmitter, and $P_{current}$ denotes the current transmission power at the transmitter. Initially, $Q_{new}$ is computed by assuming the maximum power is used at the transmitter. If $Q_{new}$ exceeds the CQI requirement for the highest MCS in the protocol, the AMCP controller 710 selects the highest MCS and sets a necessary transmission power level ($P_{new}$) for that MCS with a certain margin (block 1004). In other words, the control scheme clips the CQI spillover. This potentially minimizes the transmission power once the highest MCS has been achieved, so as to limit interference in other cells.

If $Q_{new}$ is lower than the CQI requirement for the highest MCS (block 1006), the AMCP controller 710 selects to use the maximum transmission power as $P_{new}$ and derives an appropriate MCS based on a value of $Q_{new}$ (block 1010). If $Q_{new}$ is even lower than the CQI requirement for the lowest MCS in the protocol, the AMCP controller 710 may deny the transmission and start an outage process (block 1008), in which the request of this particular link is denied or other remedies are considered, such as switching to another channel or increasing the transmission power density. In one embodiment, the AMCP controller 710 requests a resource allocation utility in the system to reduce the transmission bandwidth of a target link, so as to boost transmission power density. Where a resource allocation utility is a device that allocates an appropriate amount of time-frequency resource to a particular user.

Figure 11:
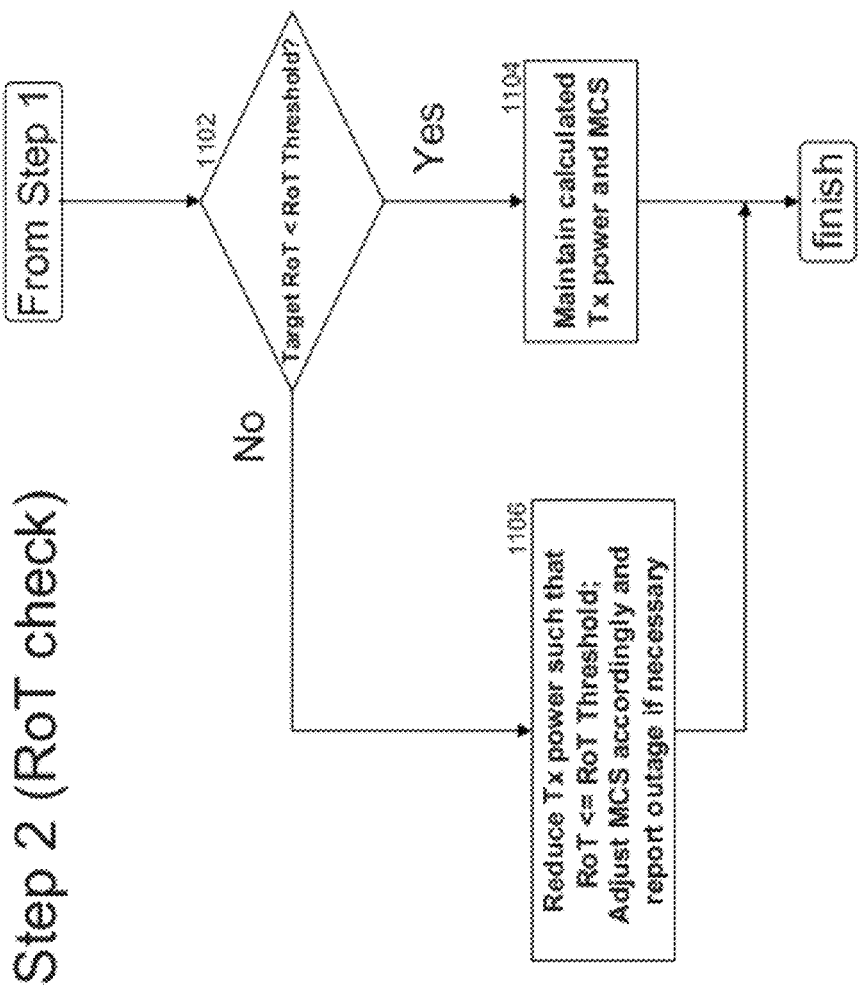
FIG. 11 illustrates a second step of the control algorithm, where the AMCP controller performs an RoT check.

In Step 2, the AMCP controller 710 performs an RoT check, as shown in FIG. 11. A new, potential RoT ($R_{new}$) at the receiver is updated by:

$$R_{new} = R_{current} + P_{new} - P_{current}$$

where $R_{current}$ denotes the current RoT measurement. Initially, $R_{new}$ is computed by assuming the transmission power level set in Step 1 is used. If $R_{new}$ is less than the RoT threshold (block 1102), the AMCP controller 710 maintains the decisions on the transmission power level and MCS in Step 1 (block 1104), and these are final outputs of the control algorithm until next round of calculation with updated measurements. If $R_{new}$ exceeds the RoT threshold, the AMCP controller 710 reduces the transmission power level to meet the RoT threshold requirement (block 1106). The new transmission power level is calculated as:

$$P_{new} = P_{current} + R_{threshold} - R_{current}$$

and the new, achievable CQI is computed as $$Q_{new} = Q_{current} + R_{threshold} - R_{current}$$

where $R_{threshold}$ denotes the RoT threshold.

Based on $Q_{new}$, the AMCP controller 710 selects the appropriate MCS. These decisions are the final outputs of the AMCP controller 710 until a next round of calculations with updated measurements.

Figure 12:
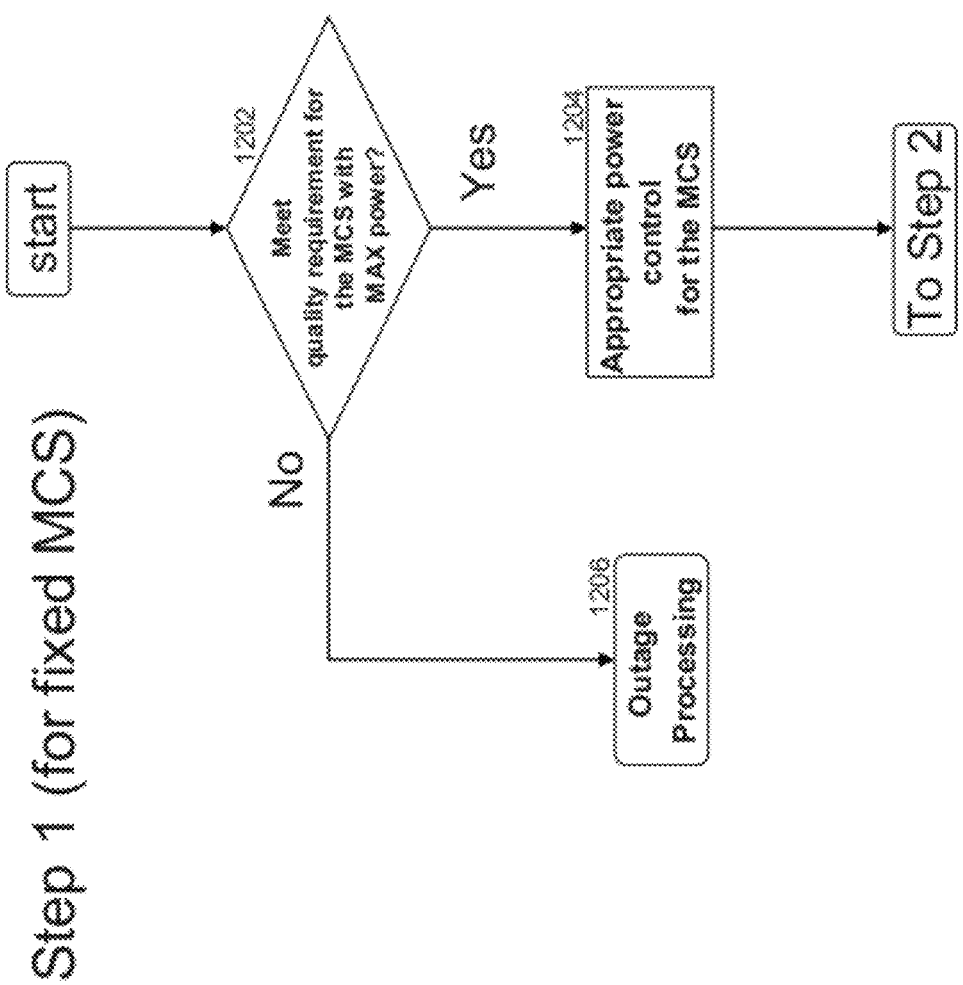
FIG. 12 illustrates a first step of the control algorithm only considering one MCS appropriate for an application such as voice.

In another embodiment, the AMCP controller 710 minimizes the transmission power while meeting the requirement of RoT threshold and meeting the data rate requirement for the applications with constant bit rate, such as voice, by using the above two-step control procedure, with modifications in Step 1 as shown in FIG. 12, where the control algorithm only considers one MCS appropriate for the application. As illustrated in FIG. 12, if the appropriate/required MCS is determined to be possible with the maximum transmission power (block 1202), then a transmission power corresponding to the appropriate/required MCS is employed (block 1204). But if the appropriate/required MCS is determined not to be possible with the maximum transmission power (block 1202), the AMCP controller 710 will deny the transmission and will start an outage process (block 1206). In the above described methods, hysteresis can be applied to avoid frequent change of control. For example, MCS may increase only if the CQI increase has passed a certain threshold.

The above described process can also be modified for open-loop control. For example, at the initial stage of network entry, a mobile station can estimate the uplink CQI and RoT based on an observed path loss from the downlink, and choose appropriated transmission power and MCS. A certain margin can also be added to account for open-loop estimation error.

In one embodiment, the calculation of the quality requirement is done statically, where the requirement for different MCS is pre-stored in a table based on system simulation or measurement. In another embodiment, the quality requirement is dynamically adjusted, resulting in a dual loop power control scheme. The above discussed power control loop with RoT constraint becomes an inner power control loop where the quality requirement is adjusted dynamically by an outer control loop. For instance, the quality requirement in a form of SINR is determined by the outer control loop based on the frame error rate measurement. The outer loop tries to maintain link quality by setting an inner loop threshold appropriately based on its measurement.

Correctly setting the RoT threshold improves the overall network capacity and also stabilizes the network operation. A low RoT threshold puts emphasis on limiting the inter-cell interference, while a very high RoT essentially disables the RoT constraint and each cell acts independently and "selfishly".

In one embodiment, a network-wide coordination among the AMCP controllers 710 and the global optimization of the RoT threshold are used to achieve the best overall performance. In this embodiment, a central processor, based on the information from the base stations, determines the value of the RoT threshold with which the network capacity on a particular subchannel is optimized.

Figure 13:
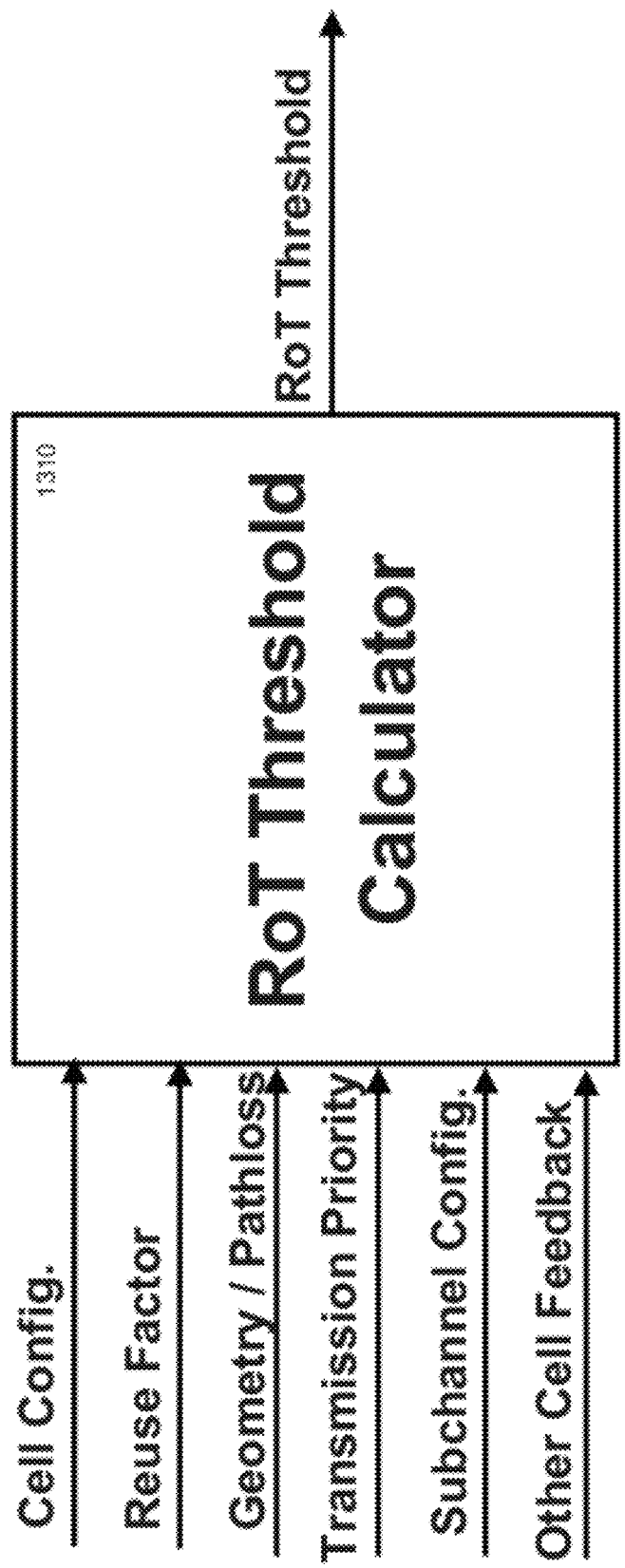
FIG. 13 depicts an RoT threshold calculator, wherein in each cell an RoT threshold is calculated for each data link.

In another embodiment, a distributed method is used to provide a solution to the above problem, where a RoT threshold calculator 1310 is devised at the base station to determine, for each data link, the RoT threshold value based on input factors such as cell configuration, frequency reuse factor, geometry/path loss information, transmission priority, subchannel configuration, and feedback from other cells or other users, as shown in FIG. 13. Some of the factors are exact numerical values (e.g. frequency reuse factor of "1"), some are statistical quantities (e.g., path loss), and others are qualitative measures (e.g., cell configuration and subchannel configuration). The threshold value is input to the AMCP controller 710, along with other information elements. The calculation may be updated from time to time, to reflect the change of the communication environment and context.

The cell configuration is referred to as a radius and distribution of neighboring cells. For large cells or isolated cells, where the main limit to the overall capacity is the transmission power, RoT threshold setting can be higher. On the other hand, for congested small cells, where the situation becomes mainly interference limited, the RoT threshold setting can be lower.

The frequency reuse factor refers to how much spectrum is used by different cells. A frequency reuse factor of "1" means that the same frequency is used in each cell. A frequency reuse factor of "3" means three different frequency sets are used for three adjacent cells. For a large frequency reuse factor, the RoT threshold can be set higher, while for a small frequency reuse factor, the RoT threshold can be set lower. (Note: a small frequency reuse factor really means high frequency reuse and a large frequency reuse factor really means low frequency reuse.)

The geometry information refers to a relative position of base stations and mobile stations, for example, distances from a mobile station to different base stations. The geometry information in combination with information on propagation environment can be used to derive path losses from a mobile to its serving and adjacent base stations or vice versa. Path losses from a base station to mobile stations in its own cell and other cells may also be derived and used. Path losses affect an amount of interference imposed on other cells due to power emission of a current cell. A relatively higher RoT threshold can be set for a communication link if the path losses to other cells are large, in which case even a relatively large power emission in the current cell may generate little interference to other cells.

If the path loss to the serving base station is close to the path loss to one or more of other base stations, as shown in Table 1 below, the mobile station may be at the boundary or overlapping area of adjacent cells. In this case, a lower RoT threshold is desirable. On the other hand, if the path loss to the serving base station is significantly less than those to the other base stations, as shown in Table 2, the mobile station may be at the center of the serving cell and little interference to other cells may be generated by its power emission. In this case, a higher RoT threshold can be used.

TABLE 1

|  | Path Loss |
| --- | --- |
| Serving Base Station | 100 dB |
| Adjacent Base Station 1 | 110 dB |
| Adjacent Base Station 2 | 105 dB |

TABLE 2

|  | Path Loss |
| --- | --- |
| Serving Base Station | 90 dB |
| Adjacent Base Station 1 | 130 dB |
| Adjacent Base Station 2 | 135 dB |

In one embodiment, the path losses from a mobile station to its serving and adjacent base stations are calculated from the strength of the downlink signals from these base stations. Each base station may send a unique downlink preamble signal or a pilot pattern. The mobile station scans through these preamble signals or pilot patterns through signal correlation or other signal processing methods. The magnitude of each correlation result indicates a path loss to each base station. The path loss information can be fed back to the base station for further processing.

In another embodiment, a unique ranging signal may be sent by a mobile station to a target base station periodically or at the beginning of access. Other adjacent base stations may also detect such signal and measure the corresponding path loss. The path loss information can be fed to the serving base station for RoT threshold setting.

The transmission priority is also considered in setting the RoT threshold. The transmission priority may include factors such as QoS of the subscriber or the application, current transmission delay, or size of data buffer waiting to be transmitted over the link. The higher the priority, the larger the delay, or the larger the buffer size, indicates the higher urgency to maximize throughput of the link under consideration. Such urgency may overweight the importance of limiting the inter-cell interference, the impact of which may be uncertain during the setting of RoT threshold. In this case, a higher RoT threshold may be set. On the other hand, if the priority is low, a relative lower RoT threshold may be set.

In an embodiment, the priority information of the links in adjacent cells is made available to the serving base station. Then, the RoT threshold setting algorithm considers all the available information jointly to optimize the overall capacity.

Subchannel configuration is referred to as the composition of subcarriers in a subchannel. In one embodiment, called Configuration A, the subchannels are composed of subcarriers which are distributed in a wide frequency spectrum. In another embodiment, called Configuration B, the subchannels are composed of subcarriers more adjacent to each other. The RoT threshold settings for these different subchannel configurations can be different due to their different interference with adjacent cells.

For Configuration A, the interference to other cells is distributed more evenly over the spectrum, so the control of averaged RoT is more important than the RoT threshold of each individual subchannel. On the other hand, for Configuration B, the interference to other cells concentrates in a certain frequency subband. High interference in such subband can overwhelm the use of such subband in other cells. Therefore, the control of RoT threshold of individual subchannel becomes very important and a lower RoT threshold is more desirable.

In one embodiment, a common RoT threshold may be first set for all the active links in one direction to control the interference emission to adjacent cells. Then this common RoT threshold may be used as one constraint in the calculation of individual RoT threshold for each link.

In yet another embodiment, the information of the interference generated from mobile stations in one cell to the base stations in other cells is exchanged between the neighboring sectors/cells and the corresponding RoT threshold is determined. In a simple case of the coordinated power control, the total interference level that one base station experiences is shared among the adjacent cells, and is then used in setting the RoT thresholds.

Increasing the base station transmission power may improve the signal quality within its own cell, but at the same time it also increases the interference with adjacent cells. In one embodiment, the total transmission power of a base station is adjusted to maximize the network capacity. The power is set higher for large cells, isolated cells, or cells with large frequency reuse factors, than that for small cells, congested cells, or cells with small frequency reuse factors. The total transmission power is adjusted by either changing the power density of each subcarrier/subchannel or changing the number of utilized subcarriers/subchannels.

In one embodiment, the above considerations of RoT constraint for power control are applied to admission control of both voice call and new data connection request. If the RoT threshold from the RoT Threshold calculator 1310 is below an admission-control threshold, which implies that current transmission in the cell is highly possible to generate strong interference to users in adjacent cells, the request for new connection will be rejected until the RoT threshold moves above the admission-control threshold.

In another embodiment, the above considerations for the control of total transmission power of a base station are applied to admission control of both voice call and new data connection request. If the used base station power has already reached its maximum threshold, the request for new connection will be rejected until the total transmission power moves below its threshold.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. In a multi-cell communication system in which each cell contains a serving base station for providing service to one or more mobile stations, and wherein a communication channel is configured into multiple subchannels, a base station which controls signal transmission on the subchannels in a serving cell to reduce inter-cell interference to other cells from the serving cell, the base station comprising:
   a transmitter for transmitting in the serving cell; and
   a controller configured to process input information and generate output signals for controlling signal transmission of the transmitter in a manner that reduces inter-cell interference to other cells from the serving cell, wherein:
      the output signals generated by the controller control the transmitter in a signal transmission on the subchannels in the serving cell; and
      the input information used by the controller comprises:
         transmission priority information related to the subchannels, the transmission priority information received from base stations in neighboring cells in the multi-cell communication system; and
         other system parameters and measurements, wherein the system parameters and measurements are selected from a group consisting of cell configuration, frequency reuse factor, cell geometry, subchannel configuration, transmission power range, service type, channel quality information, and path loss information from mobile stations to base stations in the multi-cell communication system.

2. The base station of claim 1, wherein the transmission priority information is based on factors selected from a group consisting of a quality of service of users or applications, transmission delays, and a size of a data transmission buffer.

3. The base station of claim 1, wherein the transmission priority information indicates an importance of throughput of a corresponding link.

4. The base station of claim 1, wherein the transmission priority information impacts the limiting of the inter-cell interference on subchannels.

5. The base station of claim 1, further comprising a resource allocation utility that allocates an appropriate amount of time-frequency resource for a mobile station.

6. The base station of claim 5, wherein the resource allocation utility reduces the transmission bandwidth of a target link between the serving base station and a mobile station.

7. The base station of claim 1, wherein the input information further comprises inter-cell interference information that was received from neighboring cells in the multi-cell wireless communication system, the inter-cell interference information including a level of interference experienced by a base station in the corresponding cell.

8. The base station of claim 1, wherein the input information is repeatedly updated.

9. The base station of claim 1, wherein the communication channel is further configured in the time domain into multiple time slots; and wherein the controller is further configured to process input information and generate output signals for controlling signal transmission on time-frequency resources made up of time slots and frequency subchannels.

10. In a multi-cell communication system in which each cell contains a serving base station for providing service to one or more mobile stations, and wherein a communication channel is configured into multiple subchannels, a method by a base station for controlling signal transmission on the subchannels in a serving cell to reduce inter-cell interference to other cells from the serving cell, the method comprising:
   receiving input information comprising:
      transmission priority information related to the subchannels, the transmission priority information received from base stations in neighboring cells to a serving cell in the multi-cell communication system; and
      other system parameters and measurements, wherein the system parameters and measurements are selected from a group consisting of cell configuration, frequency reuse factor, cell geometry, subchannel configuration, transmission power range, service type, channel quality information, and path loss information from mobile stations to base stations in the multi-cell communication system; and
   generating, based on the received input information, signals for controlling allocation of time-frequency resources to mobile stations in the serving cell in a manner that reduces inter-cell interference to other cells from the serving cell; and
   sending the controlling signals to a resource allocation facility for allocating subchannels for transmission in the serving cell.

11. The method of claim 10, wherein the transmission priority information is based on factors selected from a group consisting of a quality of service of users or applications, transmission delays, and a size of a data transmission buffer.

12. The method of claim 10, wherein the transmission priority information indicates an importance of throughput of a corresponding link.

13. The method of claim 10, wherein the transmission priority information impacts the limiting of the inter-cell interference on subchannels.

14. The method of claim 10, wherein the input information further comprises inter-cell interference information that was received from neighboring cells in the multi-cell wireless communication system, the inter-cell interference information including a level of interference experienced by a base station in the corresponding cell.

15. The method of claim 10, wherein the input information is repeatedly updated.

16. A method of communicating by a mobile station associated with a serving base station in a multi-cell communication system, wherein a communication channel is configured into multiple subchannels, the method comprising:
   receiving information on an allocation of a time-frequency resource from the serving base station; and
   transmitting signals in accordance with the time-frequency resource allocated by the serving base station in a manner that reduces inter-cell interference to other cells from the serving cell, wherein the resource allocation is controlled based on input information comprising:
      transmission priority information related to the subchannels, the transmission priority information received from base stations in neighboring cells in the multi-cell communication system; and
      other system parameters and measurements, wherein the system parameters and measurements are selected from the group consisting of cell configuration, frequency reuse factor, cell geometry, subchannel configuration, transmission power range, service type, channel quality information, and path loss information from mobile stations to base stations in the multi-cell communication system.

17. The method of claim 16, wherein the communication channel is further configured in the time domain into multiple time slots.

18. The method of claim 16, further comprising applying transmission power control to the signal transmission on a subchannel basis.

19. The method of claim 16, further comprising applying modulation and coding schemes to the signal transmission.

20. The method of claim 16, further comprising transmitting a ranging signal to the serving base station periodically or at the beginning of access.

21. The method of claim 16, further comprising estimating an uplink channel quality indication (CQI) based on an observed path loss on the downlink.

* * * * *

UNITED STATES PATENT AND TRADEMARK OFFICE
CERTIFICATE OF CORRECTION

PATENT NO. : 8,675,563 B2  
APPLICATION NO. : 13/252990  
DATED : March 18, 2014  
INVENTOR(S) : Xiaodong Li et al.

It is certified that error appears in the above-identified patent and that said Letters Patent is hereby corrected as shown below:

On the Title Page, Item (57), in column 2, in "Abstract", line 6, delete "path-loss" and insert -- path loss --, therefor.

In the Specification

In column 2, line 64, delete "assisting," and insert -- assisting --, therefor.

In column 3, line 40, delete "in to" and insert -- into --, therefor.

In column 3, line 57, delete "ration" and insert -- ratio --, therefor.

Signed and Sealed this
Twenty-fourth Day of June, 2014

Michelle K. Lee
*Deputy Director of the United States Patent and Trademark Office*